Patented Nov. 1, 1932

1,885,625

UNITED STATES PATENT OFFICE

MARK E. PUTNAM, OF MIDLAND, MICHIGAN, ASSIGNOR TO THE DOW CHEMICAL COMPANY, OF MIDLAND, MICHIGAN, A CORPORATION OF MICHIGAN

METHOD OF MAKING AROMATIC AMINES

No Drawing. Application filed July 5, 1928. Serial No. 290,718.

This invention relates to the control or prevention of corrosion in pressure vessels used in connection with methods for producing arylamines in general, and specifically aniline, by reaction between a halogenated aromatic hydrocarbon and ammonia in the presence of a catalyst such as a copper compound, for which cuprous copper compounds are in some cases indicated.

Owing to the avidity of cuprous salts for oxygen and the difficulty of entirely excluding oxygen from the system in which the process is carried out, or from the reaction vessel, or from the cuprous compound before its addition to the reaction mixture, there may be present in said reaction mixture cupric compounds which will react with a steel or iron pressure vessel causing corrosion and weakening of same and involve the introduction into the reaction mixture of iron compounds which may in some cases be undesirable. The entire elimination of oxygen from contact with the reaction mixture, or with its components before its admixture, is practically difficult and I find that cupric compounds may be expected to be present under operating conditions. I have further found that in the practical operation of a process for the production of aniline by the reaction between monochlorobenzene and aqueous ammonia solution in the presence of cuprous compounds as catalyst, iron not present in the original reaction mixture is later found therein and precipitates out in the later steps of the process, indicating corrosive attack upon the inner walls of the pressure vessel in which the reaction is carried out. Such corrosion, although it may represent the solution of but a small amount of metal at any one time, may eventually, because of its cumulative effect or by becoming localized, cause a serious weakening of the vessel and a dangerous condition thereof.

I have found that by adding a suitable organic reducing agent such as glucose, in small amount, to the reaction mixture the appearance of iron in the products of reaction and its later precipitation ceases, indicating that the corrosion of the metal of the pressure vessel has been stopped by the reducing action of the additive ingredient upon the cupric salts present therein.

To the accomplishment of the foregoing and related ends the invention, then, consists of the method hereinafter fully described and particularly pointed out in the claims, the following description setting forth in detail one mode of carrying out the invention, such disclosed mode illustrating, however, but one of the various ways in which the invention may be used.

I have found that it is sufficient under conditions of practical operation in the production of aniline by this method to add glucose in the proportion of one to two parts thereof to two hundred parts of monochlorobenzene used, and that working in this manner, observation over a period of some months indicates that the solution of iron from the walls of the pressure vessel is entirely prevented thereby.

I have found such proportions to be sufficient under the conditions met with in my work but it should be understood that under other conditions a larger or smaller proportion of cupric compound may be present necessitating a corresponding addition to the proportion of reducing agent used or permitting a reduction in the amount thereof. It is a simple matter in the conduct of a repetitive or continuous process of the character described, in which the products of the reaction are later released from pressure and brought under visual observation, to determine whether or not such reaction mixture contains a salt or other compound of the metal of which the pressure vessel is constructed and to adjust accordingly the proportion of reducing agent to be added to the reaction mixture.

Although I prefer to use glucose, which is readily obtained and effective, it should be distinctly understood that other reducing sugars such as lactose, maltose, levolose, etc., may be substituted for the glucose in whole or in part, or that materials containing substantial proportions of any of such sugars as e. g., their syrups, etc., which exhibit a reducing action on cupric compounds in alkaline solution, such as in Fehling's solution, may be used as equivalents of glucose.

This invention constitutes therefore a valuable advance in the art of conducting high pressure reactions in closed vessels for the production of an arylamine such as aniline or for the production of other products in which an analogous condition as to the presence of cupric or ferric ingredients may give rise to corrosion of the pressure vessel. Its use makes available as catalyst the cupric content which is thereby reduced to the cuprous form. It stops corrosion, thereby eliminating the contamination of the reaction mixture with salts of the metal of which the reactor is constructed. It avoids weakening of the pressure vessel and the dangers arising therefrom. It prolongs the life of the pressure vessel, avoids stoppage of pipe or other flow channels with precipitated metallic compounds of iron or other structural metal used which may in some cases occur and makes for peace of mind of the operators engaged in the business of handling high pressure high temperature reaction equipment.

Other modes of applying the principle of my invention may be employed instead of the one explained, change being made as regards the method herein disclosed, provided the method stated by any one of the following claims or the equivalent thereof be employed.

I therefore particularly point out and distinctly claim as my invention:—

1. In a method of making an aromatic amine by reacting at high temperature and pressure between a halogenated aromatic hydrocarbon and an aqueous ammonia solution in the presence of a catalytic cuprous compound, the step which consists in maintaining said compound substantially in the cuprous state by adding to the reaction mixture an organic reducing agent capable of converting cupric compounds to cuprous compounds.

2. In a method of making an aromatic amine by reacting at high temperature and pressure between a halogenated aromatic hydrocarbon and an aqueous ammonia solution in the presence of a catalytic cuprous compound, the step which consists in adding a reducing sugar to the reaction mixture.

3. In a method of making an aromatic amine by reacting at high temperature and pressure between a halogenated aromatic hydrocarbon and an aqueous ammonia solution in the presence of a catalytic cuprous compound, the step which consists in adding glucose to the reaction mixture.

4. In a method of making aniline involving reacting aqueous ammonia with monochlorobenzene in presence of a copper compound, the step which consists of including in the reaction mixture a reducing sugar.

5. In a method of making aniline involving reacting aqueous ammonia with monochlorobenzene in presence of a copper compound, the step which consists of including in the reaction mixture glucose.

Signed by me this 29 day of June, 1928.

MARK E. PUTNAM.